(12) United States Patent
Forster et al.

(10) Patent No.: US 11,460,707 B2
(45) Date of Patent: Oct. 4, 2022

(54) HEAD-MOUNTABLE APPARATUS, SYSTEMS AND METHODS

(71) Applicant: Sony Interactive Entertainment Inc., Tokyo (JP)

(72) Inventors: Richard James Forster, London (GB); Andrew William Walker, London (GB); Matthew Sanders, London (GB); Jessica Rose Grant, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/601,705

(22) Filed: Oct. 15, 2019

(65) Prior Publication Data

US 2020/0133009 A1 Apr. 30, 2020

(30) Foreign Application Priority Data

Oct. 31, 2018 (GB) .................................. 1817772

(51) Int. Cl.
*G06F 3/01* (2006.01)
*G02B 27/01* (2006.01)

(52) U.S. Cl.
CPC ..... *G02B 27/0176* (2013.01); *G02B 27/0172* (2013.01)

(58) Field of Classification Search
CPC ...... G06F 19/3481; G06F 1/163; G06F 3/017; G06F 3/016; G06F 3/012; G06F 1/1656;
(Continued)

(56) References Cited

U.S. PATENT DOCUMENTS

2013/0176626 A1* 7/2013 Heinrich ............... G02B 27/017
 359/630
2015/0102982 A1* 4/2015 Kinno ................. G02B 27/0176
 345/8
(Continued)

FOREIGN PATENT DOCUMENTS

CN 105068249 A 11/2015
CN 106933370 A 7/2017
(Continued)

OTHER PUBLICATIONS

Extended European Search Report for corresponding EP Application No. 19195882.6, 8 pages, dated Mar. 13, 2020.
(Continued)

*Primary Examiner* — Duc Q Dinh
(74) *Attorney, Agent, or Firm* — Matthew B. Dernier, Esq.

(57) ABSTRACT

A head-mounted display (HMD) apparatus comprises a head attachment unit comprising a first attachment member configured to attach the HMD to a user's head when the HMD is worn by the user and a first element having an adjustable weight distribution, and an adjustment unit configured to adjust a distribution of the weight of the HMD based on user profile information associated with the user, wherein the adjustment unit is configured to adjust the weight distribution of the first element of the HMD based on the user profile information by adjusting a configuration of one or more mobile components of the first element without adjusting a position or an orientation of the first element with respect to the HMD.

19 Claims, 15 Drawing Sheets

(58) Field of Classification Search
CPC .. G06F 21/32; G06F 2221/2149; G06F 3/013; G06F 3/011; G06F 3/0237; G06F 2203/011; G06F 3/0447; G02B 27/017; G02B 2027/0132; G02B 23/125; G02B 2027/0152; G02B 2027/0154; G02B 2027/0161; G02B 27/0093; G02B 2027/0178; G02B 27/01; H04N 13/344; A63B 2053/0491; A63B 53/0437; A63B 21/065; A63B 21/06
USPC ........................................................ 345/7–9
See application file for complete search history.

(56) References Cited

U.S. PATENT DOCUMENTS

2016/0231572 A1* 8/2016 Olsson ..................... G06F 3/016
2016/0327812 A1* 11/2016 Tessieres ............... G02C 7/027
2017/0277254 A1* 9/2017 Osman .................. A63F 13/335
2017/0371358 A1* 12/2017 Marti ...................... G06F 3/012
2018/0046147 A1* 2/2018 Aghara ................ A61B 5/6803

FOREIGN PATENT DOCUMENTS

| EP | 3260952 A1 | 12/2017 |
| EP | 3647854 A1 | 5/2020 |
| JP | 2009065440 A | 3/2009 |

OTHER PUBLICATIONS

Combined Search and Examination Report for corresponding application No. GB1817772.5, 5 pages, dated Apr. 25, 2019.
Examination Report for corresponding GB Application No. 18117772.5, 4 pages, dated Dec. 15, 2020.

* cited by examiner

HEAD-MOUNTABLE APPARATUS, SYSTEMS AND METHODS

BACKGROUND OF THE INVENTION

Field of the Invention

This disclosure relates to virtual reality systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

It has been proposed to provide detection arrangements for detecting a relative location of one device (such as an HMD) from another device, by using a camera on the one device to detect images of one or more markers, for example on the other device.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides a head-mounted display (HMD) apparatus comprising: a head attachment unit comprising a first attachment member configured to attach the HMD to a user's head when the HMD is worn by the user and a first element having an adjustable weight distribution; and an adjustment unit configured to adjust a distribution of the weight of the HMD based on user profile information associated with the user, wherein the adjustment unit is configured to adjust the weight distribution of the first element of the HMD based on the user profile information by adjusting a configuration of one or more mobile components of the first element without adjusting a position or an orientation of the first element with respect to the HMD.

Another example embodiment provides a method of adjusting a weight distribution of a head-mounted display (HMD) comprising a head attachment unit comprising a first attachment member configured to attach the HMD to a user's head when the HMD is worn by the user and a first element for which the weight distribution of the first element is adjustable, the method comprising:

storing user profile information for a user indicative of one or more characteristics of the user; and adjusting a distribution of the weight of the HMD based on the user profile information, comprising adjusting the weight distribution of the first element of the HMD based on the user profile information by adjusting a configuration of one or more mobile components of the first element without adjusting a position or an orientation of the first element with respect to the HMD.

Another example embodiment provides computer software which, when executed by a computer, causes the computer to perform the steps of the method defined above.

Another example embodiment provides a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
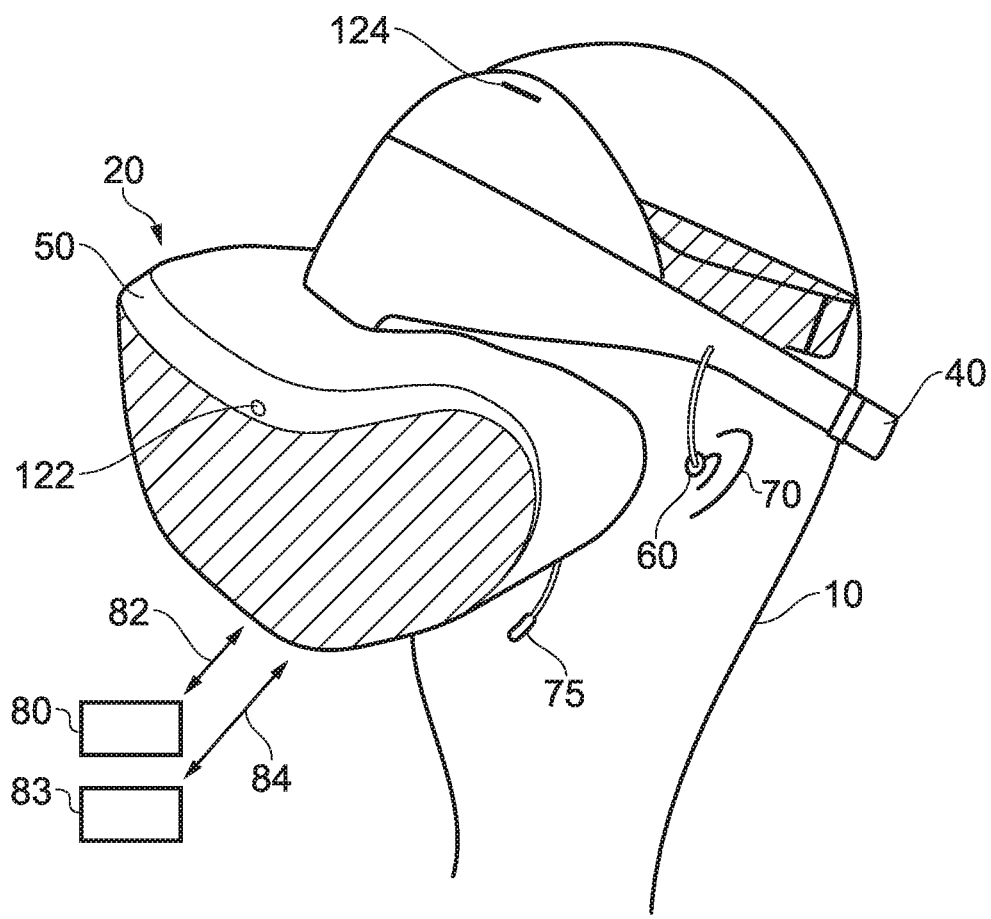
FIG. 1 schematically illustrates an HMD worn by a user.

Referring now to the drawings, wherein like reference numerals designate identical or corresponding parts throughout the several views, then referring to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
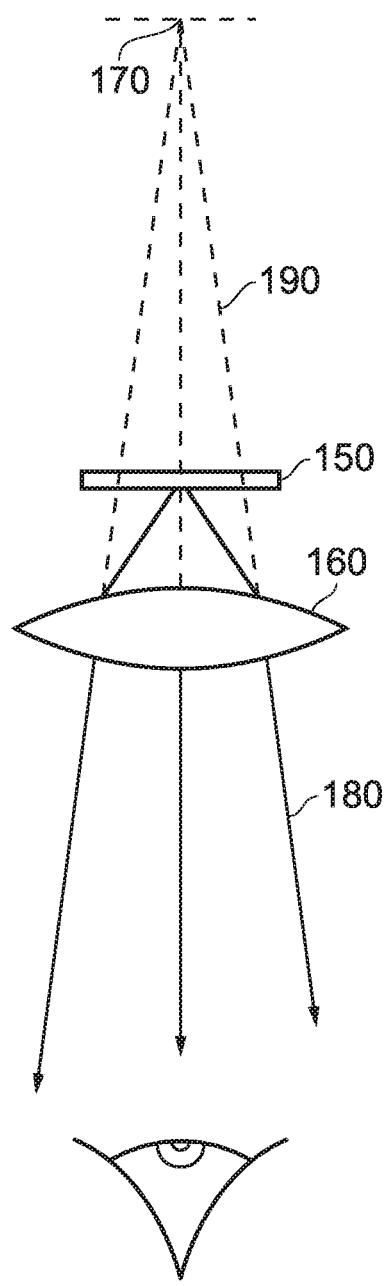
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
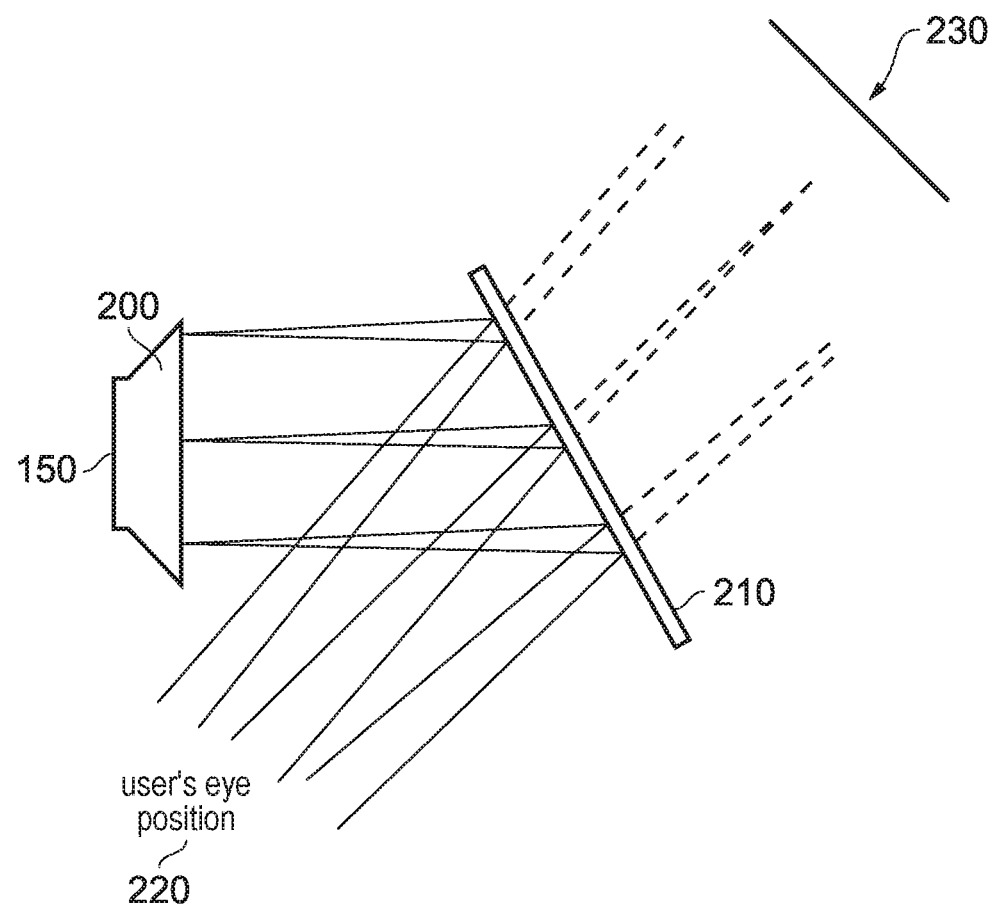
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
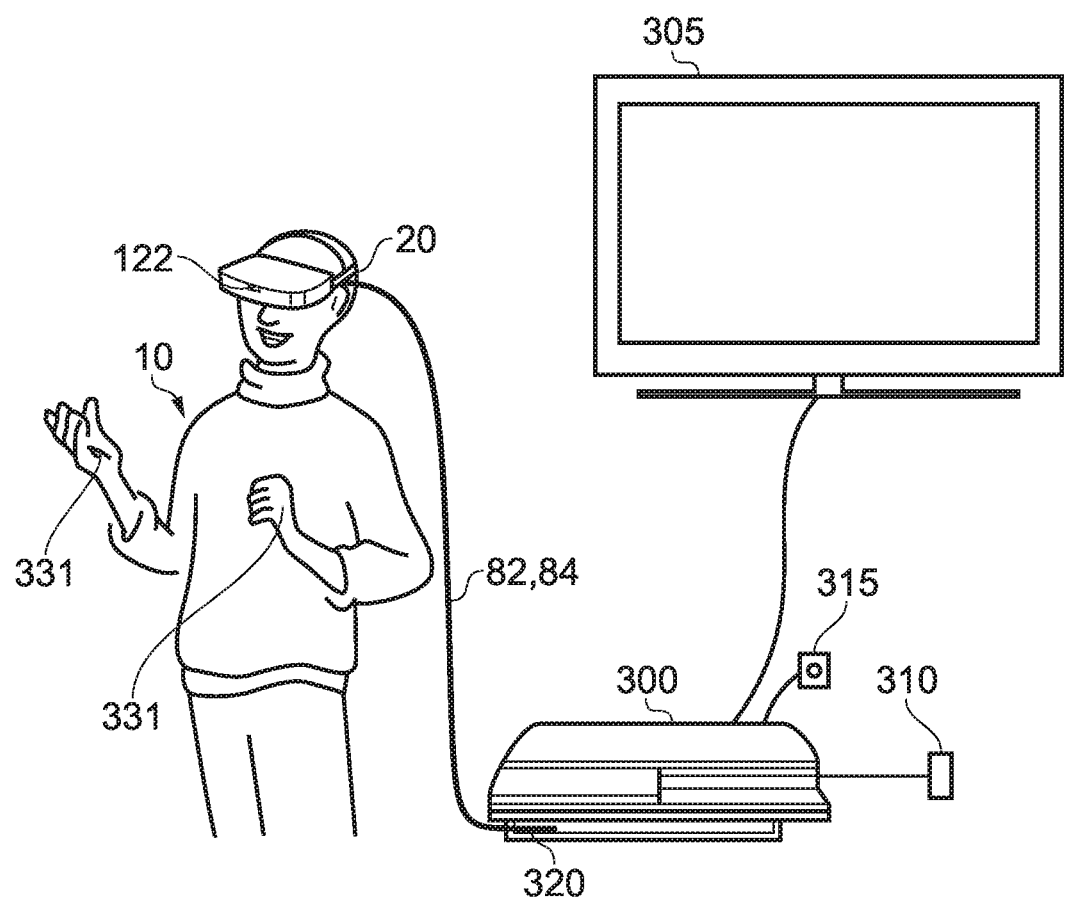
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing as discussed below.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
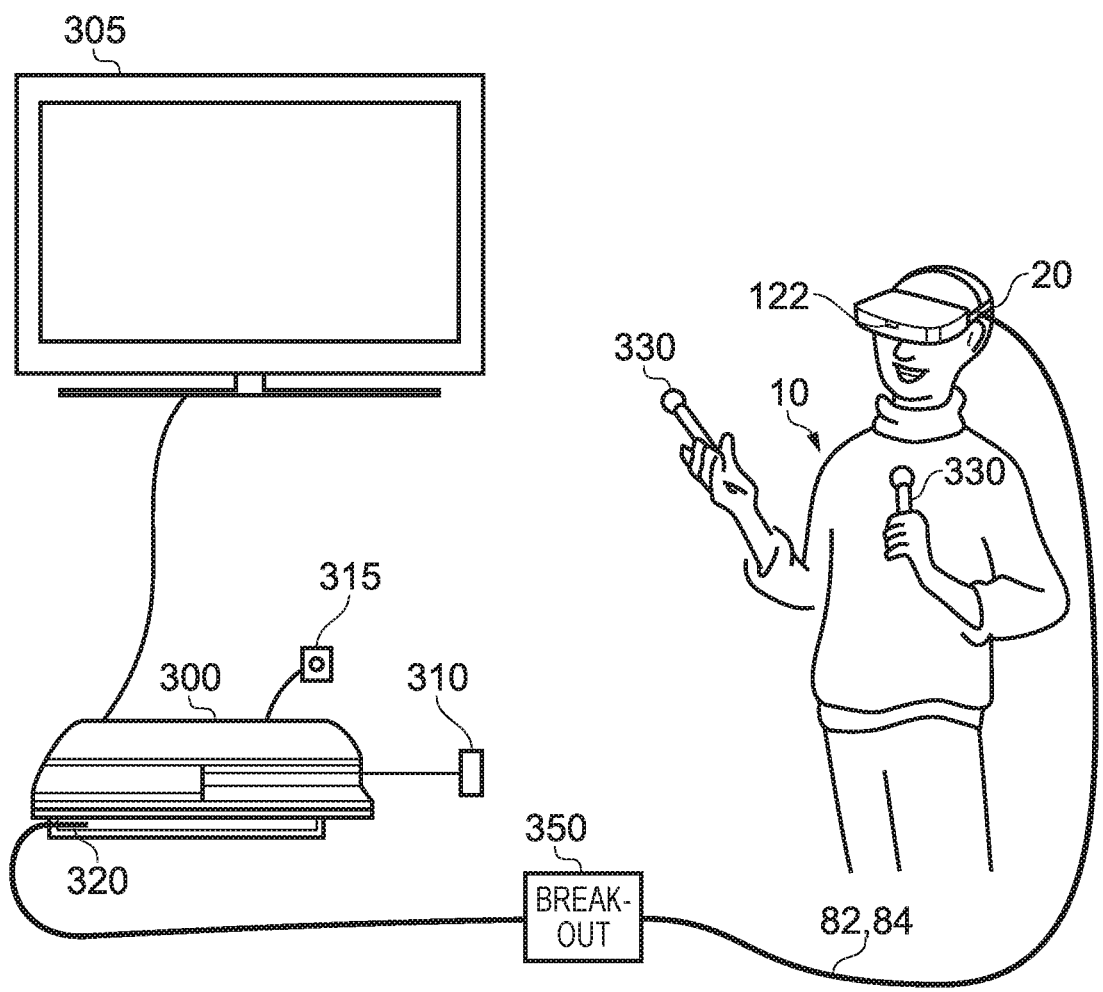

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330s which may be, for example, Sony® Move® controllers which communicate wirelessly with the games console 300 to control (or to contribute to the control of) game operations relating to a currently executed game program. the user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
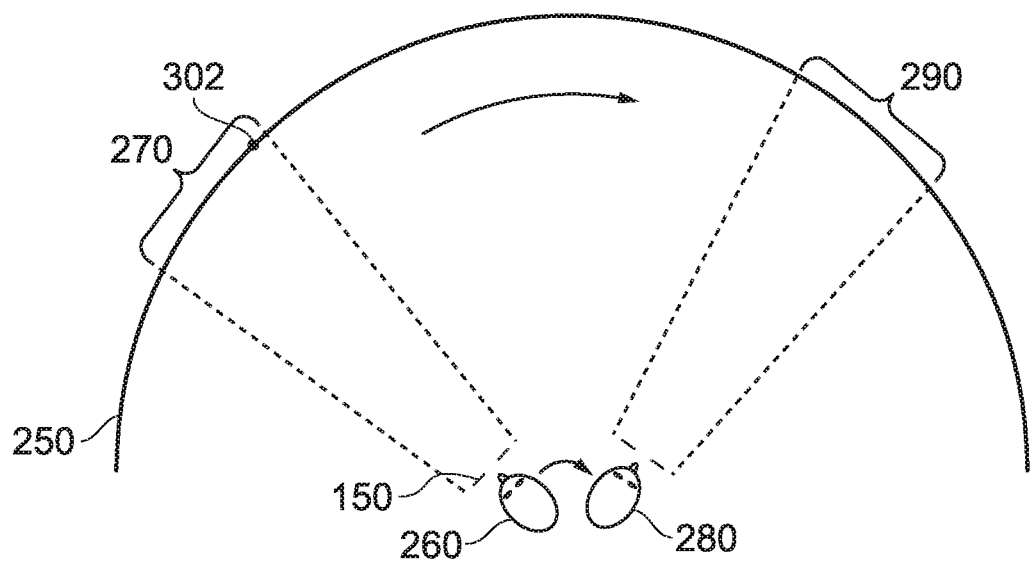
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG.

8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
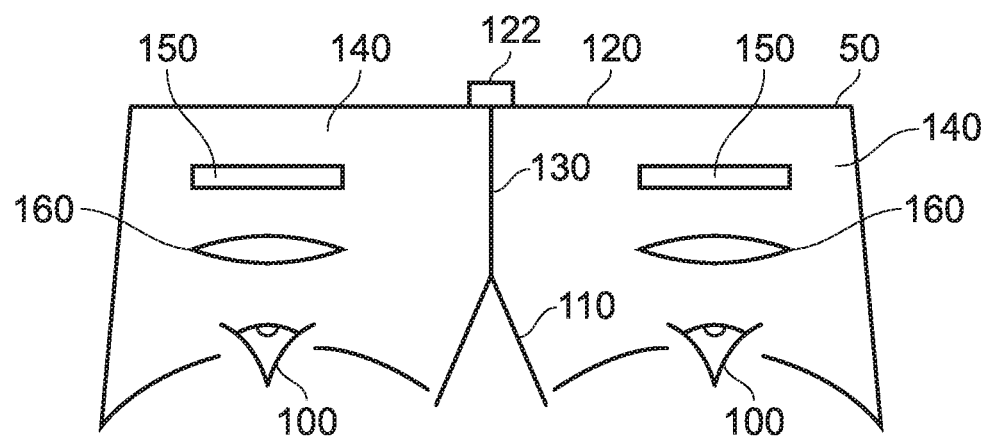
FIG. 2 is a schematic plan view of an HMD.
Figure 9A:
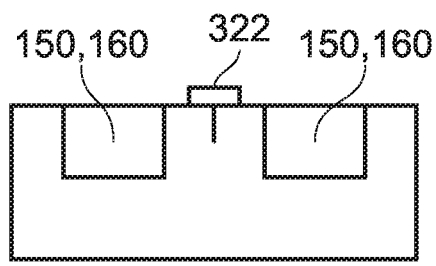
FIGS. 9a and 9b schematically illustrate HMDs with motion sensing.
Figure 9B:
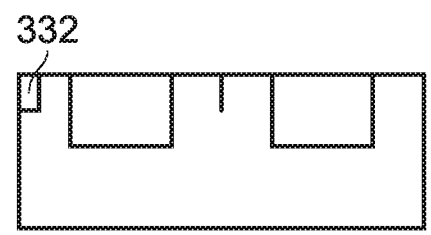

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
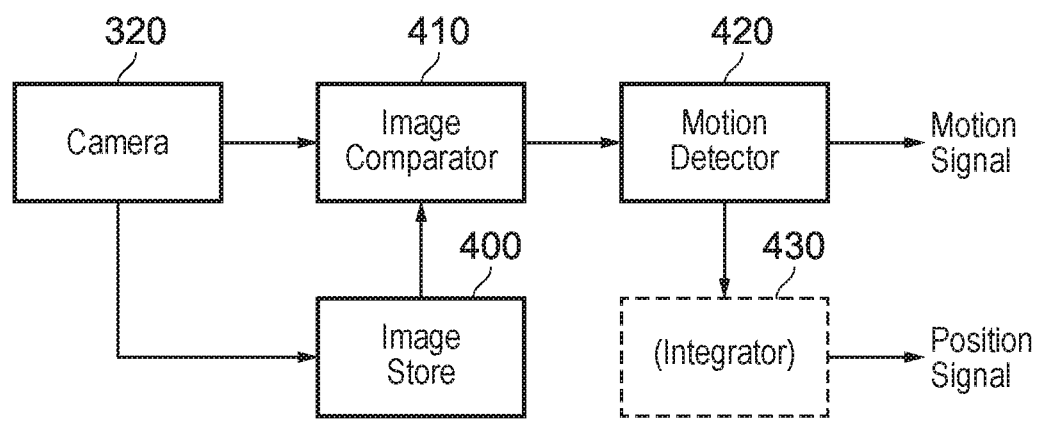
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
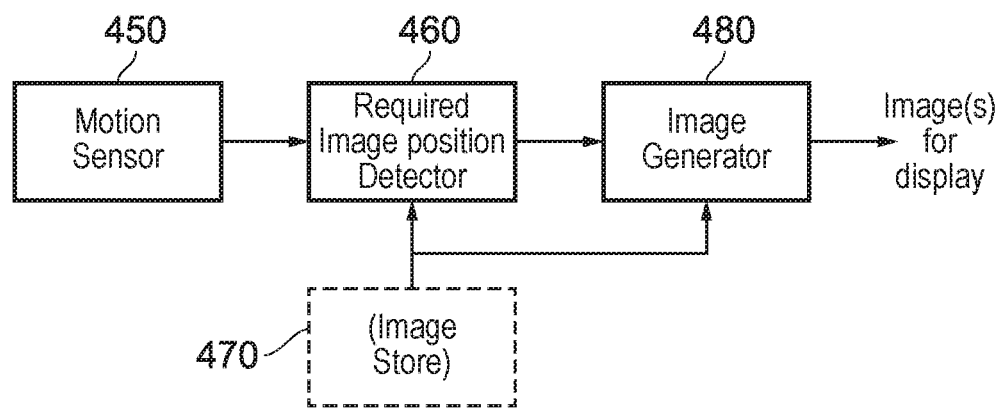
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The operations to be discussed below relate to adjustment of a configuration of an HMD in accordance with user profile information to improve usability of the HMD. A wide range of users having different physical characteristics can wear the HMD in order to view displayed content and listen to provided audio. HMDs are therefore typically constructed having properties designed to satisfy the needs of an average user so as to provide an acceptable fit for the majority of users. However, this means that the HMD does not provide a suitable fit for users having physical characteristics that differ from that expected of an average user, which can result in user discomfort such as neck or back pain thereby detracting from the user's experience. Specifically, user's having one or more physical characteristics differing from that expected of an average user can experience discomfort due to the pressure exerted by the HMD on certain portions (contact points) of the user's head, which can prevent prolonged use of the HMD.

Figure 12A:
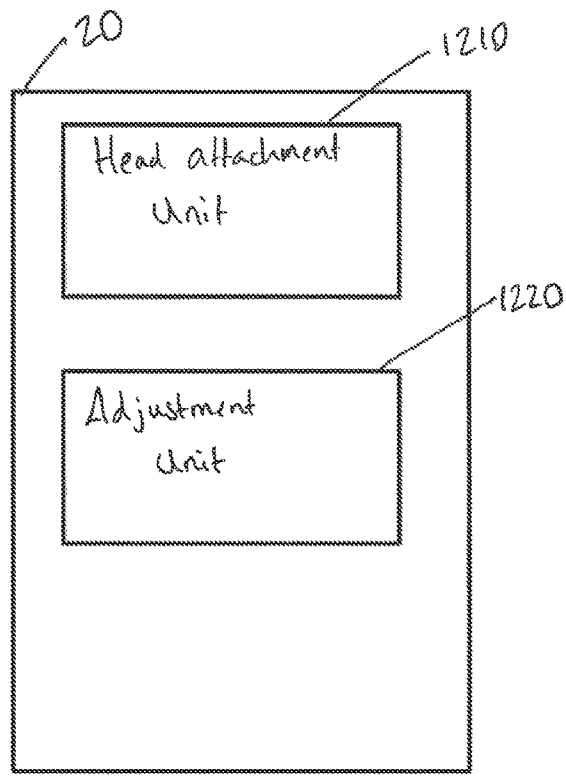
FIG. 12a schematically illustrates an HMD comprising a head attachment unit and an adjustment unit.

FIG. 12a schematically illustrates an HMD 20 comprising a head attachment unit 1210 and an adjustment unit 1220. In embodiments of the disclosure, an HMD 20 apparatus is provided, comprising: a head attachment unit 1210 comprising a first attachment member configured to attach the HMD to a user's head when the HMD is worn by the user and a first element having an adjustable weight distribution; and an adjustment unit 1220 configured to adjust a distribution of the weight of the HMD based on user profile information associated with the user, wherein the adjustment unit 1220 is configured to adjust the weight distribution of the first element of the HMD 20 based on the user profile information by adjusting a configuration of one or more mobile components of the first element without adjusting a position or an orientation of the first element with respect to the HMD. The head attachment unit 1210 comprises at least one attachment member that contacts one or more portions of the user's head in order to attach the HMD to the head of the user. In this way, the HMD can be secured to the head of the user so that the HMD remains rigidly fixed to the user's head even when the user performs head movements for interacting with content displayed by the HMD. The attachment member can be made from a range of materials having suitable strength and flexibility in order to rigidly secure the HMD 20 to the user's head, and examples of such materials include rubber, plastic or cloth or a combination thereof. It will be appreciated that an attachment member comprising other materials having suitable properties (flexibility and strength) can be provided in accordance with embodiments of the disclosure. As such, the adjustment unit 1220 can be configured to adjust the configuration of the attachment member with respect to the head attachment unit 1210 based on the user profile information in order to attach the HMD 20 to the user's head.

Figure 13A:
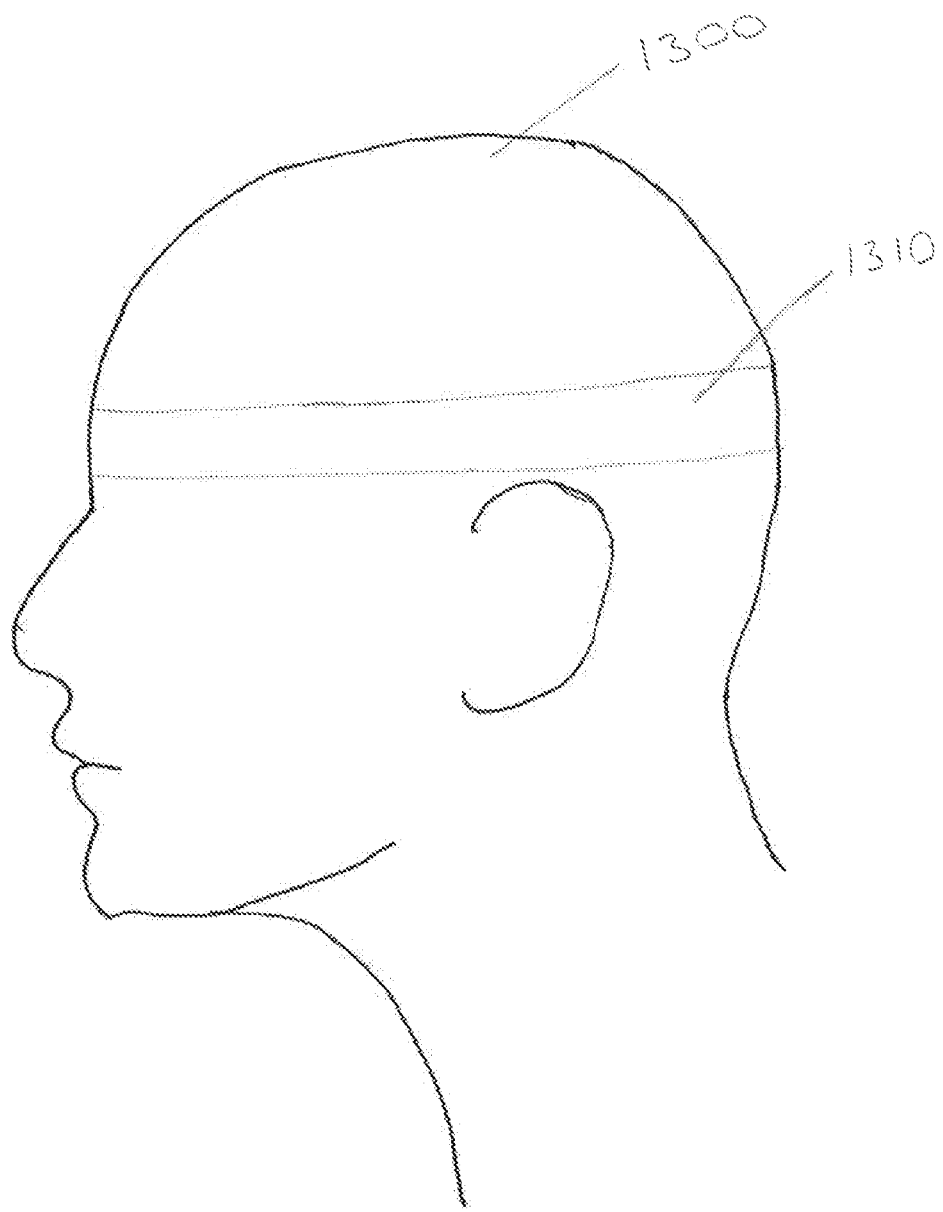
FIG. 13a is a schematic side view showing a head attachment unit comprising a first attachment member that attaches to a user's head when an HMD is worn by the user.
Figure 13B:
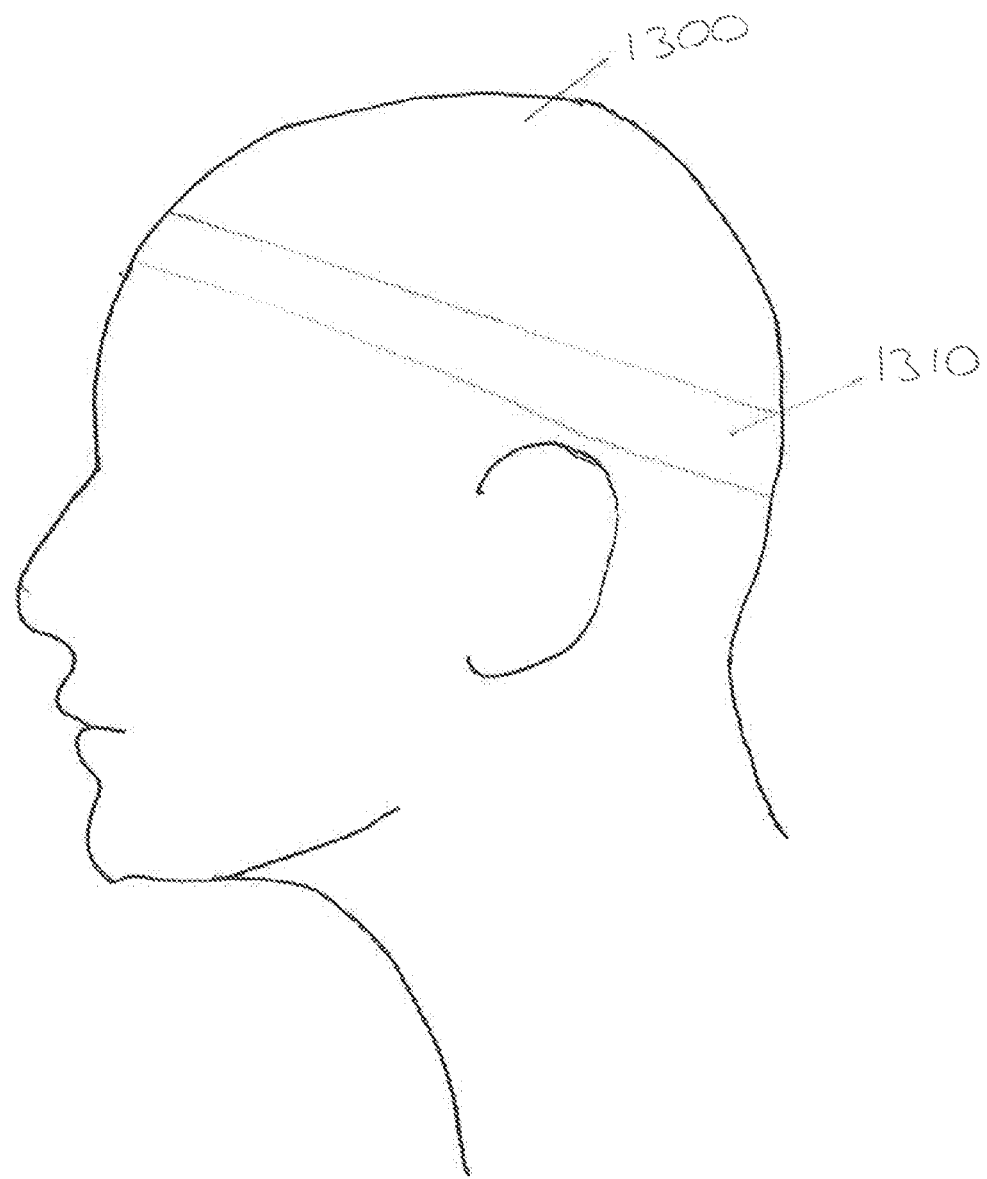
FIG. 13b is a schematic side view showing a head attachment unit comprising a first attachment member angled with respect to the horizontal when worn by a user.

FIG. 13a is a schematic side view showing a state in which a user wears the HMD 20. The first attachment member 1310 may be an annular headband that extends around the user's head 1300 to surround the forehead and the rear portion of the user's head. In this way the HMD 20 is attached to the user's head 1300 in an annular fashion and the first attachment member 1310 is connected to the display portion 50 (not shown in FIG. 13) to hold the display portion 50 in a fixed position with respect to the user's head 1300. The first attachment member 1310 can extend around an entire circumference of the user's head 1300, which means that the first attachment member 1310 contacts one or more portions of the user's head that are located above the user's ears and the first attachment member 1310 is approximately horizontal with respect to the ground when the user's head 1300 is vertical with respect to the ground. Alternatively, the first attachment member 1310 may be positioned on the user's head at an angle with respect to the horizontal (e.g. angled up to 45 degrees with respect to the horizontal) such that the first attachment member 1310 is titled with respect to the horizontal when worn on the user's head and the first attachment member 1310 extends around the forehead portion of the user's head 1300 and around a lower portion of the rear portion of the user's head, as illustrated in FIG. 13b.

Figure 12B:
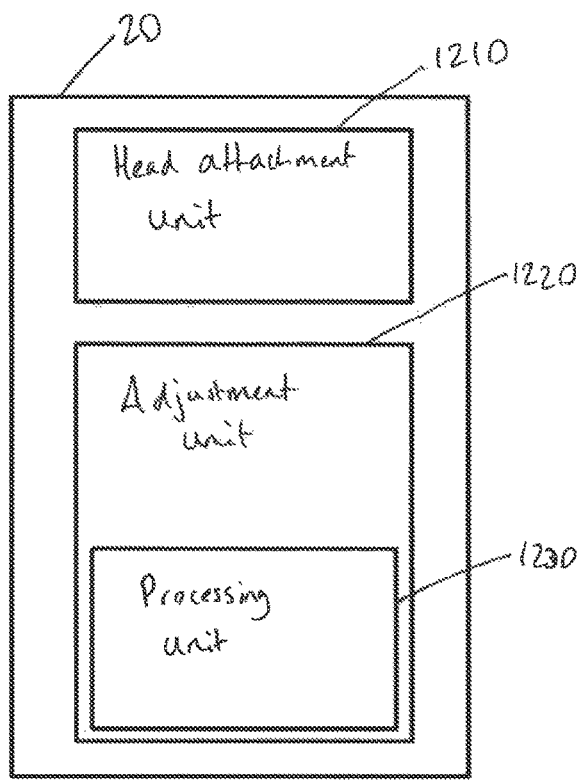
FIG. 12b schematically illustrates an HMD comprising a head attachment unit, an adjustment unit and a processing unit.

Referring again to FIG. 12a, the HMD 20 comprises the head attachment unit 1210 and the adjustment unit 1220, wherein the adjustment unit 1220 is configured to adjust a configuration of the HMD 20 by adjusting at least one of a position and an orientation of the first attachment member 1310 with respect to the HMD 20. FIG. 12b schematically illustrates an HMD 20 comprising the head attachment unit 1210, the adjustment unit 1220 and a processing unit 1230. In embodiments of the disclosure, the processing unit 1230 can be provided separate to the HMD 20 and be configured to communicate data to the HMD 20 via a wireless communication link (such as a WiFi or a Bluetooth® link) or a cabled link 82, 84, or the processing unit 1230 can be provided as part of the HMD 20. In some examples, the processing unit 1230 is provided as part of another device 300, 350 to which the HMD is connected. Alternatively, the processing unit 1230 may be provided as part of the adjustment unit 1220 and the configuration of the head attachment unit 1210 of the HMD 20 can be adjusted by the adjustment unit 1220 in response to processing performed by the processing unit 1230.

The head attachment unit 1210 may comprise a plurality of attachment members and the adjustment unit 1220 can be configured to change a configuration of the HMD 20 by adjusting at least one of a position and an orientation of each of the plurality of attachment members. This means that the configuration of the head attachment unit 1210 can be changed by the adjustment unit 1220 so that the head attachment unit 1210 can attach the HMD 20 to the user's head in a manner that allows the configuration of the HMD 20 to be adapted for a wide range of head sizes and head shapes. The adjustment unit 1220 comprises one or more adjusters each configured to adjust a configuration of one or more attachment members associated with the adjuster. In some examples, each adjuster is capable of being manually adjusted by a user in order to allow the user to selectively adjust a configuration of a given attachment member in accordance with the user's preferences. This means that at least one of the position and the orientation of at least the first attachment member 1310 can be adjusted manually by the user to allow the user to manually adapt the HMD 20 to fit the user's head as appropriate.

Alternatively or in addition, the adjusters may comprise one or more electric motors each controlled by the processing unit 1230. The processing unit 1230 can be configured to control the adjustment unit 1220 to adjust a configuration of at least the first attachment member 1310 such that the configuration of the HMD 20 is adjusted in response to the processing performed by the processing unit 1230. In this way, the one or more electric motors of the HMD 20 can be controlled in accordance with processing performed by the processing unit 1230 to adjust at least one of the position and the orientation of at least the first attachment member 1310. In some examples, the processing unit 1230 is configured to perform processing based on user profile information indicative of one or more physical characteristics of the user or a previous HMD setting preferred by the user, and the one or more electric motors can be controlled by the adjustment unit 1220 to adapt the configuration of the head attachment unit 1210 in response to the result of the processing performed by the processing unit 1230.

Figure 14A:
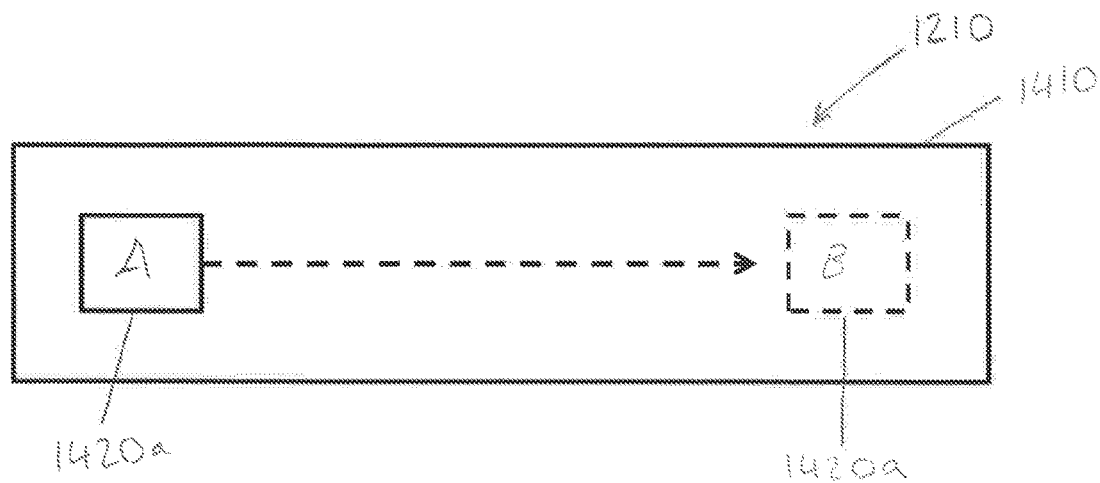
FIG. 14a schematically illustrates an HMD comprising a first element having an adjustable weight distribution.

FIG. 14a schematically illustrates an HMD 20 comprising the first element 1410 having an adjustable weight distribution. In embodiments of the disclosure, the head attachment unit 1210 comprises the first element 1410 for which the distribution of the weight of the first element 1410 is adjustable by the adjustment unit 1220. The first element 1410 (which may also be referred to as the first member 1410) comprises at least one moveable (mobile) component 1420a having a given mass (measured in units of kilograms) and a configuration of the at least one moveable component 1420a can be adjusted by the adjustment unit 1220 to adjust the distribution of the weight of the first element 1410 without adjusting the position or orientation of the first element 1410. The HMD 20 may comprise a mechanical adjustment mechanism comprising one or more electric motors configured to adjust the position of the at least one moveable component 1420a or the HMD 20 may comprise a plurality of electromagnets each configured to generate a magnetic field that exerts a force on nearby magnetic components in order to relocate the magnetic components. In some examples, the mechanical adjustment mechanism comprises at least one shaft that extends along at least part of the length of the first element 1410 and one or more moveable components 1420a connected to the at least one shaft can be repositioned by adjusting the position and/or orientation of the shaft using the one or more electric motors. In this way the position of the shaft can be adjusted to position the moveable component 1420a at either position A or position B, as shown in FIG. 14a.

The adjustment unit 1220 can be configured to adjust at least one of a position and an orientation of the moveable component 1420a with respect to the first element 1410 such that the first element 1410 can be adjusted to adopt at least a first configuration having a first weight distribution and a second configuration having a second weight distribution, wherein the first weight distribution is different to the second weight distribution. In the example illustrated in FIG. 14a, the first element 1410 has a first weight distribution when the moveable component 1420a is located at position A within the volume of the first element 1410, and the first element 1410 has a different weight distribution when the moveable component 1420a is located at position B within the volume of the first element 1410. In other words, the configuration of the first element 1410 can be controlled so that the first element 1410 assumes (i.e. takes-on) one of a plurality of configurations where each configuration has a different associated weight distribution. The position and/or the orientation of the moveable component 1420a can be adjusted, thereby changing the centre-of-mass of the first element 1410 such that the weight of the first element 1410 is distributed across the body of the first element 1410 in dependence upon the position and/or orientation of the moveable component 1420a within the body of the first element 1410. For example, there may be a plurality of respective positions (e.g. positions A, B, C, D, E and so on) that the moveable component 1420a can be moved to (and subsequently confined to) within the first element 1410 so that the first element 1420a can be adjusted to adopt one of the plurality of configurations. Whilst FIG. 14a illustrates an example where a position of the moveable component 1420a is changed by the adjustment unit 1220 to adjust the weight distribution of the first element 1410, it will be appreciated that the moveable component 1420a may have an asymmetrical shape such that just an orientation of the moveable component 1420a can be changed by the adjustment unit 1220 to adjust the weight distribution of the first element 1410. FIG. 14a illustrates the first element 1410 for which the moveable component 1420a can adopt one of two possible positions (position A or position B) within the volume occupied by the first element 1410, however, it will be appreciated that in embodiments of the disclosure the first element 1410 may comprise a plurality of moveable components (e.g. 1420a, 1420b, 1420c and so on) and an arrangement of each moveable component can be adjusted to adjust the weight distribution of the first element 1410. In some examples, the plurality of moveable components 1420a, 1420b may all have the same mass or alternatively some of the moveable components may be lighter (have a smaller mass) or heavier (have a greater mass) than others.

In embodiments of the disclosure, the first element 1410 extends from a front portion of the HMD proximate to the user's forehead to a rear portion of the HMD proximate to a rear portion of the user's head. For example, the first element 1410 may be included within the body of the first attachment member 1310, as illustrated in FIG. 13a, or may be attached to a surface of the first attachment member 1310 such that both the first element 1410 and the first attachment member 1310 extend from the front portion of the HMD 20 proximate to the user's forehead to the rear portion of the HMD 20 proximate to the rear portion of the user's forehead. In some examples, the first element 1410 has a rectangular profile, like that illustrated in FIG. 14a, having a length such that the first element 1410 extends from the forehead to the rear portion of the user's head and a width of several cm (e.g. up to 7 cm) and a thickness of several cm (e.g. up to 4 cm). For example, the position A illustrated in FIG. 14a may correspond to a front portion of the HMD that is proximate to the user's forehead and the position B may correspond to a rear portion of the HMD that is proximate to the rear portion of the user's head and the first element 1410 may extend from the forehead portion of the user's head to the rear portion of the user's head via a portion of the user's head that is proximate to the user's temple. In some examples, the first element 1410 extends from the forehead to the rear portion of the user's head via the user's left temple, and a second element 1410 (i.e. the second element 1410 has the same properties as the first element 1410) may extend from the forehead to the rear portion of the user's head via the user's right temple, and the adjustment unit 1220 can be configured to adjust the weight distribution for both first element 1410 and the second element 1410 to adjust the weight distribution of the HMD 20.

Figure 14B:
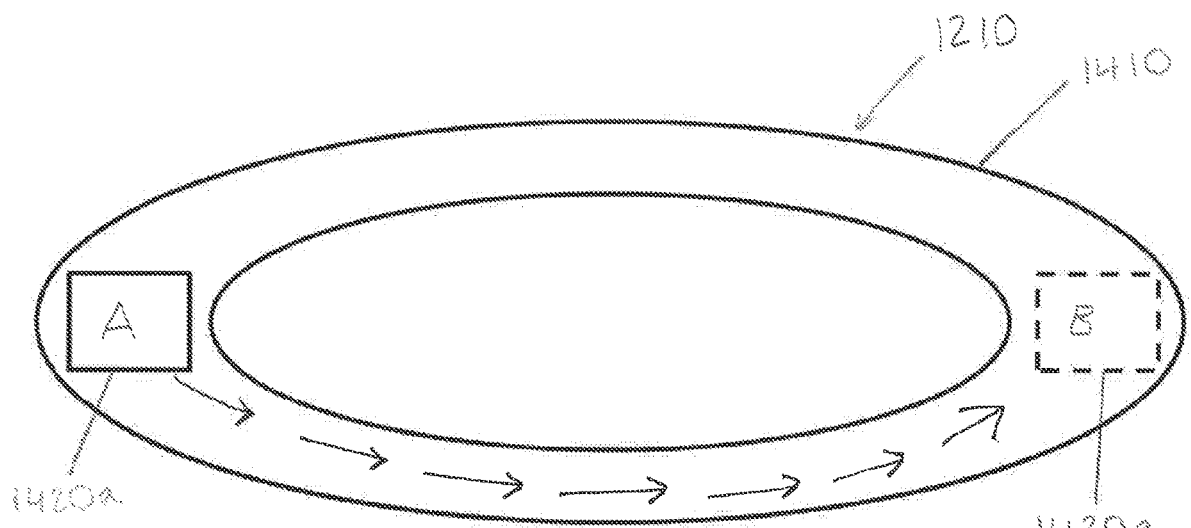
FIG. 14b schematically illustrates an HMD comprising a first element having an adjustable weight distribution in which the first element has an annular shape.

FIG. 14b schematically illustrates an HMD 20 comprising the first element 1410 having an adjustable weight distribution in which the first element 1410 is ring-shaped. The first element 1410 can have a variety of different shapes and may for example have a rigid predetermined shape that is determined in advance or may have a flexible shape that allows the shape of the first element 1410 to adapt to changes in the shape of the first attachment member 1310 when the first attachment member 1310 is adjusted to fit a particular user's head. For example, the first element 1410 may be attached to an external surface of the first attachment member 1310 facing away from the user's head or facing towards the user's head, or the first element 1410 may be included within the body of the first attachment member 1310 of the HMD 20 (i.e. the first element 1410 may be encapsulated by the body of the first attachment member 1310). The first element 1410 can have an annular shape (as illustrated in FIG. 14b) similar to the shape of the first attachment member 1310 illustrated in FIG. 13a, such that the first element 1410 is included within the body of the first attachment member 1310 and is curved to allow the first element 1410 and the first attachment member 1310 to extend around a contour of the user's head.

In embodiments of the disclosure, the adjustment unit 1220 is configured to adjust the distribution of the weight of the HMD 20 based on the user profile information associated with the user by adjusting a configuration of one or more mobile components of the first element 1410 without adjusting a position or orientation of the first element 1410 with respect to the HMD 20 in order to adjust the weight distribution of the first element 1410 of the HMD 20 in accordance with the user profile information. The adjustment unit 1220 can be configured to adjust the position and/or orientation of the first attachment member 1310 based on the user profile information so as to attach the HMD 20 to the user's head. In addition, the adjustment unit 1220 can be configured to adjust the distribution of the weight of the HMD 20 based on the user profile information by adjusting the configuration of the one or more mobile components of the first element to adjust the weight distribution of the first element 1410 of the HMD 20. The user profile information can be obtained by measuring properties of the user when the user is or is not wearing an HMD, and/or may be based on a user input provided by the user as part of a calibration process, and/or may be based on a previously selected configuration of the head attachment unit 1210. The calibration process may comprise displaying images to the user via the HMD 20 to instruct the user to move their head to change their viewpoint, and the head movements performed by the user during the calibration procedure can be detected to build a profile of the user's average head movement and average head orientation. For example, the calibration process may be used to instruct the user to perform a plurality of respective head movements by displaying a plurality of different markers, and the profile of the user's average head movement can be generated to indicate the user's tendency to move their head. As part of the calibration process, the HMD can be configured to display a range of different markers to the user to prompt the user to move their head to view markers within the user's current field of view and outside the user's current field of view and the profile of the user's average head movement thus provides an indication of the propensity of the user to move their head. In this way, a user's tendency to move their eyes instead of their head, or vice versa, may be detected and used to generate the user profile information for the user.

The user profile information obtained for a given user can be stored and subsequently used when the HMD 20 is to be worn by that user, in order to adapt the configuration of the head attachment unit 1210 of the HMD 20 for the user. In this way, the configuration of the head attachment unit 1210 of the HMD 20 can be adapted for the user based on either the user's physical characteristics or a previous HMD configuration selected by the user. The processing unit 1230 can be configured to analyse the user profile information for the user and a distribution of the weight of the HMD 20 can be determined for the user and the adjustment unit 1220 can adjust the distribution of the weight of the first element 1410 of the HMD 20 in response to the analysis performed by the processing unit 1230. When the user profile information comprises information is indicative of the physical characteristics of the user and also comprises information regarding an HMD configuration previously selected by the user, the information regarding the previously selected HMD configuration may be given a higher priority rating than the information is indicative of the physical characteristics so that the configuration of the head attachment unit 1210 is adapted to adopt the previously selected HMD configuration.

In embodiments of the disclosure, the user profile information comprises information indicative of one or more characteristics of the user comprising one or more from the list consisting of: a head size of the user; an average head movement of the user; and an average head orientation of the user, and the adjustment unit 1220 is configured to adjust the distribution of the weight of the first element 1410 of the HMD based on one or more of the characteristics of the user. For example, the user profile information may comprise average head orientation information indicating that the user has a tendency to adopt a Forward Head Posture (FHP) when wearing the HMD 20 or that the user has a tendency to tilt their head downwards when wearing the HMD 20. In this case, the adjustment unit 1220 can be configured to adjust the weight distribution of the first element 1410 of the HMD 20 in accordance with the user profile information to allocate a greater proportion of the total weight of the first element 1410 to a portion of the first element 1410 that is proximate to a rear portion of the user's head by adjusting one or more of the mobile components of the first element 1410 to thereby adjust the weight distribution of the HMD 20 with respect to the user's head to assist the user in maintaining a normal straight head position. Alternatively or in addition, the user profile information may comprise average head orientation information indicating that the user has a tendency to adopt a posture whereby the user's head leans to one side (i.e. leans to the right or the left), and the adjustment unit 1220 can adjust the weight distribution of the first element 1410 of the HMD 20 in accordance with the user profile information to allocate a greater proportion of the total weight of the first element 1410 to a portion of the first element 1410 that is proximate to one side of the user's head. Hence more generally, the head attachment unit 1210 can adjust the weight distribution of the first element 1410 in order to selectively allocate a fraction of the total weight of the first element 1410 to a given portion of the first element 1410 based on the user profile information to assist the user in adopting a normal straight head position whilst wearing the HMD 20. Alternatively or in addition, the user profile information may comprise average head movement information and the adjustment unit 1220 can adjust the weight distribution of the first element 1410 of the HMD 20 in accordance with the user profile information to allocate a greater proportion of the total weight of the first element 1410 to a portion of the first element 1410 that is proximate to the user's ears when the profile information indicates that the user has a tendency to move their head. This means that the weight of the HMD 20 can be distributed so that the moment (moment=force×distance) associated with the weight of the first element can be reduced when the user has a tendency to perform excessive head movements. User profile information may be acquired by detecting one or more properties of the user when wearing an HMD to generate a profile for the user. Images captured of a user whilst wearing an HMD can be analysed to generate the information indicative of the size of the user's head (e.g. head circumference, head diameter or head radius). Similarly, images captured of a user over a predetermined period of time whilst the user wears the HMD can be analysed to generate information indicative of the user's average head movement and to generate information indicative of the user's average head orientation. Alternatively or in addition, image data captured by the forward facing camera 322 provided on the front of the HMD and/or inertial sensor data obtained by the hardware motion detector 332 mounted on the HMD can be processed to generate the information indicative of the user's average head movement and the information indicative of the user's average head orientation. It will be appreciated that the user profile information can be generated using a number of different sources and that the adjustment unit 1220 can adjust a distribution of the weight of the HMD 20 by adjusting the weight distribution of the first element 1410 based on the user profile information to adapt the configuration of the HMD 20 to improve user comfort.

In some examples, one or more of the characteristics indicated by the user profile information can be used to identify a user as belonging to a given category of user. A categorisation may be applied to each user that matches them to a reference profile that resembles their user profile. In a most basic example, a user can be classed as a "forward head user", "rear head user", "left head user", or "right head user" based on the user's average head orientation information, and a given weight distribution for the first element 1410 can be associated with each categorisation such that the first element 1410 of the HMD 20 is adjusted by the adjustment unit 1220 to have a different weight distribution for each categorisation. As such, in the case where the first element 1410 is ring-shaped, the adjustment unit 1220 can adjust the configuration of the mobile components of the first element 1410 in response to a categorisation of the user so as to move the mobile components towards a portion of the first element that is proximate to the front portion, the rear portion, the left portion or the right portion of the user's head in dependence upon the categorisation of the user. In another example, a user may be categorised based on the user's head size information so that user's are classed as "small", "medium" or "large", wherein a first weight distribution of the first element 1410 of the HMD 20 is associated with the "small" class a second weight distribution of the first element 1410 of the HMD 20 is associated with the "medium" class and a third weight distribution of the first element 1410 of the HMD 20 is associated with the "large" class. In another example, a user may be categorised based on the user's average head movement information so that user's are classed based on their head movement propensity. For example, user's may be classed on a scale of 1 to 5, where 1 indicates that the user typically does not move their head unless necessary (i.e. the user is an 'eye-mover') and 5 indicates that the user frequently moves their head rather than relying exclusively on eye motion (i.e. the user is a 'head-mover'). It will be appreciated that any number of categories could be defined, so as to represent the spectrum of different users in a suitably accurate manner, and a configuration of the HMD 20 can be adjusted in accordance with such user profile information to improve usability of the HMD for the user.

In embodiments of the disclosure the user profile information comprises weight distribution information indicative of a weight distribution of the HMD previously selected by the user. As part of the previously described calibration process, or as part of an HMD setup procedure, the HMD 20 can be configured to display a menu with which the user can interact with to manually select the weight distribution of the first element 1410 of the HMD 20 from a plurality of predetermined weight distributions according to the user's personal preferences. As described previously, the configuration of the mobile components of the first element 1410 can be adjusted such that the first element 1410 can adopt one of a plurality of predetermined weight distributions, and the user can manually select one predetermined weight distribution according to a selection from a menu listing a plurality of respective HMD weight distributions. As such, information indicative of the weight distribution of the HMD that is selected by the user can be stored as part of the user profile information, and the adjustment unit 1220 of the HMD can be configured to adjust a distribution of the weight of the HMD 20 based HMD weight distribution information indicative of the weight distribution of the HMD previously selected by the user. In this way, the user can preferentially select a particular HMD weight distribution that they find provides a most comfortable distribution of the weight of the HMD 20 and this HMD weight distribution information can be stored in the user profile associated with the user. As such, the distribution of the weight of the HMD 20 can be adjusted to the user's preferred setting when the user profile associated with the user is loaded upon the user performing a login operation or upon the HMD 20 detecting that the identify of the user wearing the HMD (e.g. user identification based on biometric authentication such as a biometric property of the user's eye detected by one or more cameras).

In embodiments of the disclosure, the moveable (mobile) component 1420*a* or a mobile magnetically sensitive mass component 1520*a* as described herein below comprises one or more battery packs used by the HMD, and/or similarly one or more other functional components of the HMD such as a processor and heatsink or fan, optionally in conjunction with other passive mass elements. Hence more generally, the mass of the mobile component 1420*a*, 1520*a* may optionally comprise at least in part a functional component of the HMD; in other words the mobile mass component need not be wholly additional to the HMD for the purpose of mass distribution, but may at least in part be existing mass from operating components of the HMD, made mobile for this purpose.

In embodiments of the disclosure, the adjustment unit 1220 is configured to adjust at least one of a position and an orientation of the first element 1410 with respect to the HMD 20 in accordance with the user profile information. As well as adjusting the weight distribution of the first element 1410 by adjusting a configuration of the mobile components within the body of the first element 1410 without adjusting a position or an orientation of the body of the first element with respect to the HMD, the position and orientation of the body of the first element 1410 is also adjustable in accordance with one or more of the user's characteristics or the HMD weight distribution information indicative of the weight distribution of the HMD previously selected by the user. The first element 1410 may be fixed to a surface of the first attachment member 1310 or included within the body of the first attachment member 1310, and therefore the position and the orientation or the first element 1410 is adjusted when adjusting the position and the orientation of the first attachment member 1310. This means that the first attachment member 1310 can be used to attach the HMD 20 to the user's head and the weight distribution of the first element 1410 located in or on the first attachment member 1310 can be adjusted in accordance with the user profile information to adjust the weight distribution of the HMD 20. Hence more generally, the weight distribution of the first element 1410 can be adjusted in accordance with the user profile information and in addition to this the position and the orientation of the first element 1410 may also be adjusted with respect to the HMD 20 to further adjust the weight distribution of the HMD 20.

In some examples, the first attachment member 1310 may comprise an adjustment mechanism comprising one or more electric motors and the body of the first element 1410 may be connected to the adjustment mechanism, such that the position and the orientation of the first element 1410 can be adjusted with respect to the first attachment member 1310 based on the user profile information. This means that the first attachment member 1310 can be positioned and orientated with respect to the HMD 20 in order to attach the HMD 20 to the user's head to achieve a suitably comfortable fit according to the user's head size, and the position and the orientation of the first element 1410 with respect to the HMD 20 can be adjusted without having to adjust the configuration of the first attachment member 1310 to adjust the weight distribution of the HMD 20. Therefore, the first attachment member 1310 can serve solely to attach the HMD 20 to the user's head and the position and the orientation of the first element 1410 can be adjusted according to the user profile information without adjusting the configuration of the first attachment member 1310 to provide greater flexibility for adjusting the weight distribution of the HMD 20 by allowing adjustments of position, orientation and weight distribution of the first element 1410.

In embodiments of the disclosure, the first attachment member 1310 is configured to extend at least partially around a circumference of the user's head and the first attachment member comprises the first element 1410. As has been discussed, the first element 1410 may be included within the body of the first attachment member 1310 or may be attached to a surface of the first attachment member 1310. The position and orientation of the first attachment member 1310 can be adjusted so that at least a portion of the first attachment member 1310 conforms to the outline of the shape of the user's head in order for the first attachment member 1310 to securely attach the HMD 20 to the user's head. In other words, the first attachment member 1310 can extend at least partially around a contour of the user's head. Similarly, the first element 1410 included within the first attachment member 1310 will also extend at least partially around the contour of the user's head. When the first element 1410 is disposed within the first attachment member 1310 and extends along a substantial portion of the length of the first attachment member 1310, the adjustment unit 1220 can adjust the centre of mass of the first element 1410 and this therefore allows the weight of the first element 1410 to be distributed so as to allocate a fraction of the moveable weight of the first element 1410 to a portion of the length of the first attachment member 1310. As such, the adjustment unit 1220 can be configured to adjust a weight distribution of the first attachment member 1310 by adjusting the weight distribution of the first element included within the first attachment member 1310.

In embodiments of the disclosure, the one or more mobile components of the first element 1410 comprise one or more mobile magnetically sensitive mass components. One or more of the mobile components 1420a of the first element 1410 can be produced using magnetically sensitive material such as cobalt, nickel or iron (other magnetic material may suitably be used). The respective magnetically sensitive components may be individual magnetic balls each having an associated mass. The magnetically sensitive mass components can each have the same mass or may have a range of different masses, and the respective magnetically sensitive components may have a range of different shapes (e.g. spherical, cubic). For example, when the total weight of the HMD 20 including the first element 1410 is approximately 500-700 grams, the total mass of all the magnetically sensitive mass components may be anywhere within the range of 50 grams to 250 grams. In this case, there may be just one magnetically sensitive mass component or there may be a plurality of respective magnetically sensitive mass components which each have a weight anywhere within the range of 10 grams to 50 grams. The position and/or orientation of each magnetically sensitive component within the body of the first element 1410 can be adjusted using one or more electromagnets to exert an attractive force on each magnetically sensitive component and the attractive force can be used to move and confine a given magnetically sensitive component to a particular region of the first element 1410. In this way, the positioning of the respective magnetically sensitive components can be adjusted to achieve a variable weight distribution for the first element 1410 in dependence upon the weight of each component and the position of each component.

In embodiments of the disclosure, the first element 1410 comprises a liquid and the one or more mobile components comprise one or more mobile magnetically sensitive mass components. The first element 1410 may comprise a liquid within which the mobile components are able to move in response to the attractive force exerted by a nearby electromagnet. For example, the liquid may be an oil, such a kerosene, synthetic motor oil or vegetable oil, which acts as a carrier fluid for a plurality of magnetic components (such as fragments of iron) suspended within the oil. As such, the magnetic components can be held within the liquid and moved within the liquid to adjust the weight distribution of the first element 1410. In some examples the first element 1410 may comprise a ferrofluid, and a position of a magnetically sensitive iron fragment within the ferrofluid can be adjusted in response to a magnetic field generated by an electromagnet to adjust the distribution of the weight of the first element 1410.

Figure 15A:
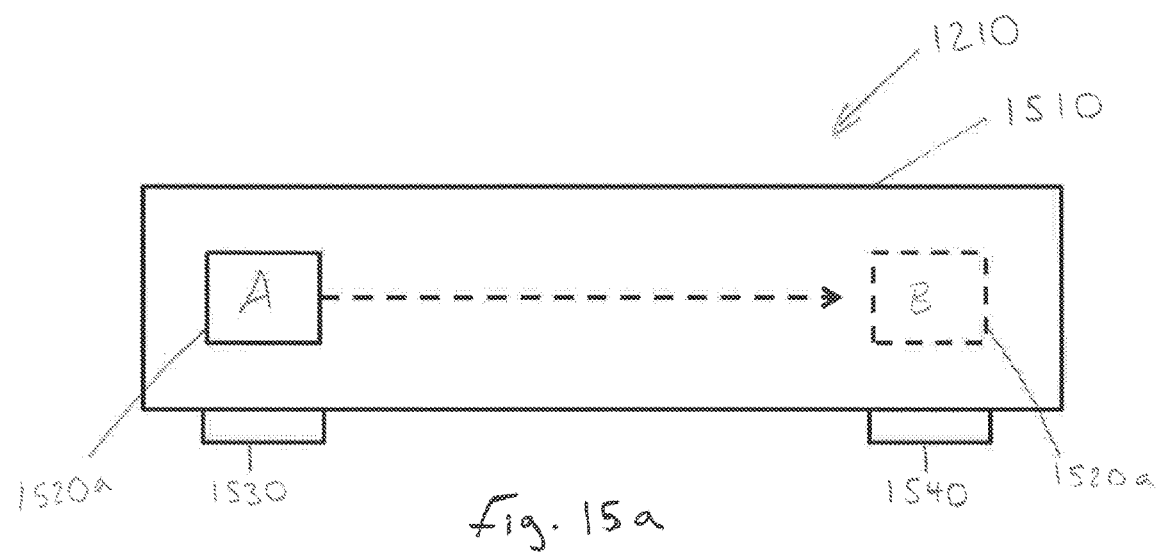
FIG. 15a schematically illustrates a head attachment unit comprising a first element and a plurality of electromagnets.

FIG. 15a schematically illustrates a head attachment unit 1210 of the HMD 20 comprising a plurality of electromagnets 1530, 1540. In embodiments of the disclosure, the head attachment unit 1210 comprises a plurality of electromagnets 1530, 1540 each configured to generate a magnetic field that exerts a force on the mobile magnetically sensitive mass components 1520a within a predetermined distance of the electromagnet 1530, 1540. Embodiments of the present disclosure provide an HMD 20 comprising a plurality of electromagnets 1530, 1540 to adjust the configuration of one or more mobile magnetic items included within the HMD in order to enable the centre of mass of the HMD 20 to be adjusted whilst allowing the total weight attributed to the head attachment unit 1210 to be kept lower than would otherwise be possible using an HMD 20 comprising mechanical adjustment means to adjust the weight distribution of the HMD 20. The electromagnets 1530, 1540 can be made relatively small so as to be disposed within the head attachment unit 1210 HMD and the electromagnets 1530, 1540 can be disposed at different locations around the head attachment unit 1210. The mobile magnetically sensitive mass components 1520a are able to move within the first element 1510 of the head attachment unit 1210, and an electric current can be supplied to each electromagnet 1530, 1540 to generate a magnetic field which exerts a force on each mobile magnetically sensitive mass component 1520a in the first element 1510 that is within the predetermined distance of the electromagnet 1530, 1540. The plurality of electromagnets 1530, 1540 can be positioned proximate to the first element 1510 and the magnetic field generated by each electromagnet 1530, 1540 therefore extends into at least part of the region of the first element 1510 in which the magnetically sensitive mass components 1520a are mobile, so that the position and/or orientation of the respective magnetically sensitive mass components 1520a can be adjusted in response to the magnetic force exerted by the electromagnets 1530, 1540.

By adjusting the electric current supplied to each electromagnet 1530, 1540, the magnitude of the magnetic field generated by a given electromagnet can be adjusted, and therefore the force exerted by a given electromagnet 1530, 1540 on a magnetically sensitive mass components 1520a by virtue of the magnetic field can be adjusted. Specifically, the electric current supplied to each electromagnet 1530, 1540 can be adjusted in accordance with the user profile information to adjust the magnetic field generated by a given electromagnet 1530, 1540 in order to adjust a configuration of the mobile magnetically sensitive mass components 1520a within the first element 1510 which results in adjustment of the weight distribution of the first element 1510. The plurality of electromagnets 1530, 1540 can be disposed along a length of the first element 1510 and the electromagnets 1530, 1540 can each be controlled to generate a magnetic field in order to move the magnetic components along the length of the first element 1510, as illustrated by the dashed arrow in FIG. 15a.

In the example shown in FIG. 15a, the mobile magnetically sensitive mass component 1520a is initially located at position A, because the current supplied to the electromagnet 1530 results in a magnetic field that attracts the mobile magnetically sensitive mass component 1520a towards the electromagnet 1530. In other words, the mobile magnetically sensitive mass component 1520a is initially confined to a first region of the first element 1510 by virtue of the magnetic field generated by the electromagnet 1530 which results in a first weight distribution for the first element 1510. When adjusting the weight distribution of the first element 1510 of the HMD 20 in accordance with the user profile information, for example by moving the magnetically sensitive mass component 1520a from the position A to the position B so that the first element 1510 can adopt a different weight distribution, the adjustment unit 1220 decreases the magnitude of the current supplied to the electromagnet 1530 whilst also increasing the magnitude of the current supplied to the electromagnet 1540. The adjustment unit 1220 can therefore decrease the strength of the magnetic field generated by the electromagnet 1530, and in some circumstances will stop supplying a current to the electromagnet 1530 entirely, whilst increasing the strength of the magnetic field generated by the electromagnet 1540, so that the magnetically sensitive mass component 1520a will move within the body of the first element 1510 to the position B which is proximate to the electromagnet 1540. This provides an example of a first element 1510 having two possible configurations (i.e. magnetically sensitive mass component 1520a at position A or position B) where each configuration has a different weight distribution, and the adjustment unit 1210 can adjust the configuration of the first element 1510 to cause the first element 1510 to adopt one of the configurations in order adjust the weight distribution of the first element 1510. It will be appreciated that there may be a plurality of respective positions within the body of the first element 1510 (e.g. positions A, B, C, D, E and so on) that the magnetic component 1520a can be moved to (and subsequently confined to) by adjusting the configuration of the magnetic components using a plurality of respective electromagnets disposed proximate to the first element 1510.

Figure 15B:
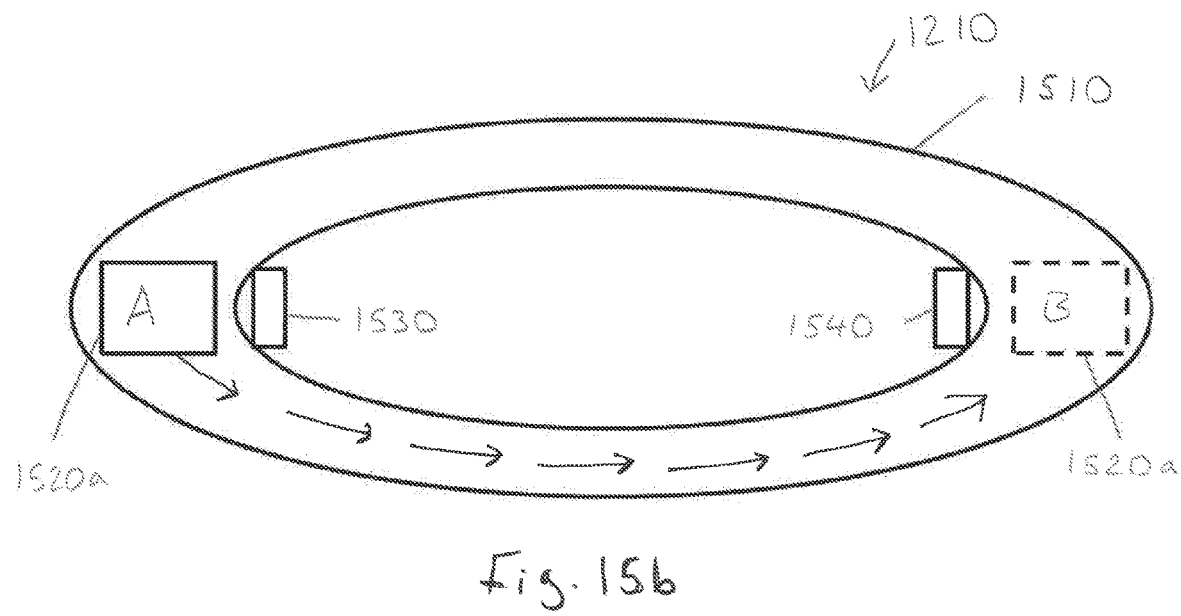
FIG. 15b schematically illustrates a head attachment unit comprising a first element and a plurality of electromagnets in which the first element has an annular shape.

FIG. 15b schematically illustrates a head attachment unit 1210 comprising a first element 1510 and a plurality of electromagnets 1530, 1540 in which the first element 1510 has an annular shape. As has been discussed, the first element 1510 can have an annular shape (as illustrated in FIG. 14b) similar to the shape of the first attachment member 1310 illustrated in FIG. 13a, such that the first element 1510 is included within the body of the first attachment member 1310 and is curved to allow the first element 1410 to extend around a contour of the user's head. In the case where the first element 1510 has an annular shape, the electromagnets 1530, 1540 can be disposed with respect to annulus as illustrated in FIG. 15b so as to allow the magnetic component 1520a to be moved within the body of the first element 1510 to adjust the weight distribution of the first element 1510. For example, the position A may correspond to the front portion of the HMD 20 that is proximate to the user's forehead and the position B may correspond to the rear portion of the HMD 20 that is proximate to the rear portion of the user's head. In dependence upon the user profile information, the adjustment unit 1220 can adjust the weight distribution of the first element 1510 by moving the magnetic component 1520a to the position A or the position B so as to selectively distribute the weight of the first element 1510 of the HMD 20 with respect to the user's head to improve the user's comfort when wearing the HMD 20. Some users may find that the HMD 20 can be worn more comfortably and thus operated with improved usability when a greater proportion of the weigh of the HMD 20 is distributed towards the front portion of the HMD (i.e. when the magnetic component 1520a is positioned at position A) whereas other users may find that the HMD 20 can be worn more comfortably and thus operated with improved usability when a greater proportion of the weigh of the HMD 20 is distributed towards the rear portion of the HMD (i.e. when the magnetic component 1520a is positioned at position A). In embodiments of the present disclosure, the plurality of electromagnets 1530, 1540 are positioned at respective locations with respect to the first element 1510 and each electromagnet 1530, 1540 is configured to generate an independently adjustable magnetic field to adjust a distribution of the plurality of magnetically sensitive mass components 1520a with respect to the first element 1510. Therefore, the configuration of the plurality of magnetically sensitive mass components 1520a can be adjusted based on the user profile information to distribute the weight of the HMD 20 to adopt one weight distribution from a plurality of possible weights distributions in dependence upon one or more physical characteristics of the user or a weight distribution of the HMD previously selected by the user.

Figure 15C:
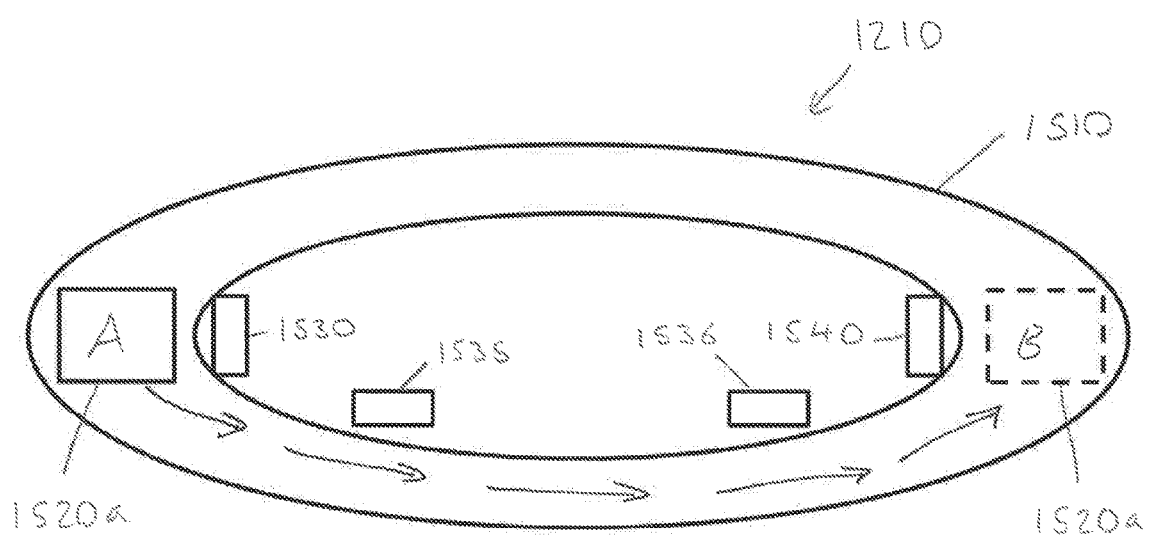
FIG. 15c schematically illustrates a head attachment unit comprising a first element and a plurality of electromagnets configured to generate a magnetic field according to a predetermined schedule.

In embodiments of the disclosure, the processing unit 1230 performs an analysis of the user profile information to determine a weight distribution of the first element 1510 of the HMD 20 for the user from a plurality of possible weight distributions that the first element 1510 is capable of adopting, and the adjustment unit 1220 is configured to adjust the weight distribution of the first element 1510 in response to control signals generated by the processing unit 1230. Hence more generally, the adjustment unit 1220 can be configured to adjust the weight distribution of the HMD 20 under the control of the processing unit 1230. Therefore, the FIG. 15c schematically illustrates a head attachment unit 1210 comprising a first element 1510 and a plurality of electromagnets 1530, 1535, 1536, 1540 each configured to generate a magnetic field according to a predetermined schedule. In embodiments of the disclosure, the plurality of electromagnets 1530, 1535, 1536, 1540 are positioned at respective locations with respect to the first element 1510 and each electromagnet is configured to generate a magnetic field according to a predetermined timing schedule. When adjusting the weight distribution of the first element 1510 by moving the magnetically sensitive mass components 1520a from the position A to the position B, the adjustment unit 1220 can be configured to control the electric current supplied to each electromagnet 1530, 1535, 1536, 1540 according to the predetermined timing schedule. By scheduling the timings at which each electromagnet is configured to generate a magnetic field, the individual electromagnets 1530, 1535, 1536, 1540 can be coordinated with respect to each other in order to improve the efficiency with which the magnetically sensitive mass components 1520a can be distributed around the ring-shaped first element 1510. For example, at a time T1 the current supplied to the electromagnet 1530 can be set to a minimum value (for example, the minimum value may be zero such that no current is supplied to the electromagnet) whilst the current supplied to the electromagnet 1535 is set to a maximum value. In addition, at the time T1 the current supplied to the electromagnets 1536 and 1540 can be set to the minimum value. At a later time T2, when the magnetically sensitive mass components 1520a is proximate to the electromagnet 1535, the current supplied to the electromagnet 1536 can be set to the minimum value whilst the current supplied to the electromagnet 1536 is set to the maximum value. In addition, at the time T2 the current supplied to the electromagnets 1530 and 1540 can be set to the minimum value. This process of supplying electric currents to the respective electromagnets in a coordinated manner can be performed under the control of the processing unit 1230 until the magnetically sensitive mass components 1520a arrives at the desired position, position B in this example. This provides an example of respective electromagnets generating magnetic fields according to a predetermined synchronisation to adjust the weight distribution of the first element 1510.

Figure 15D:
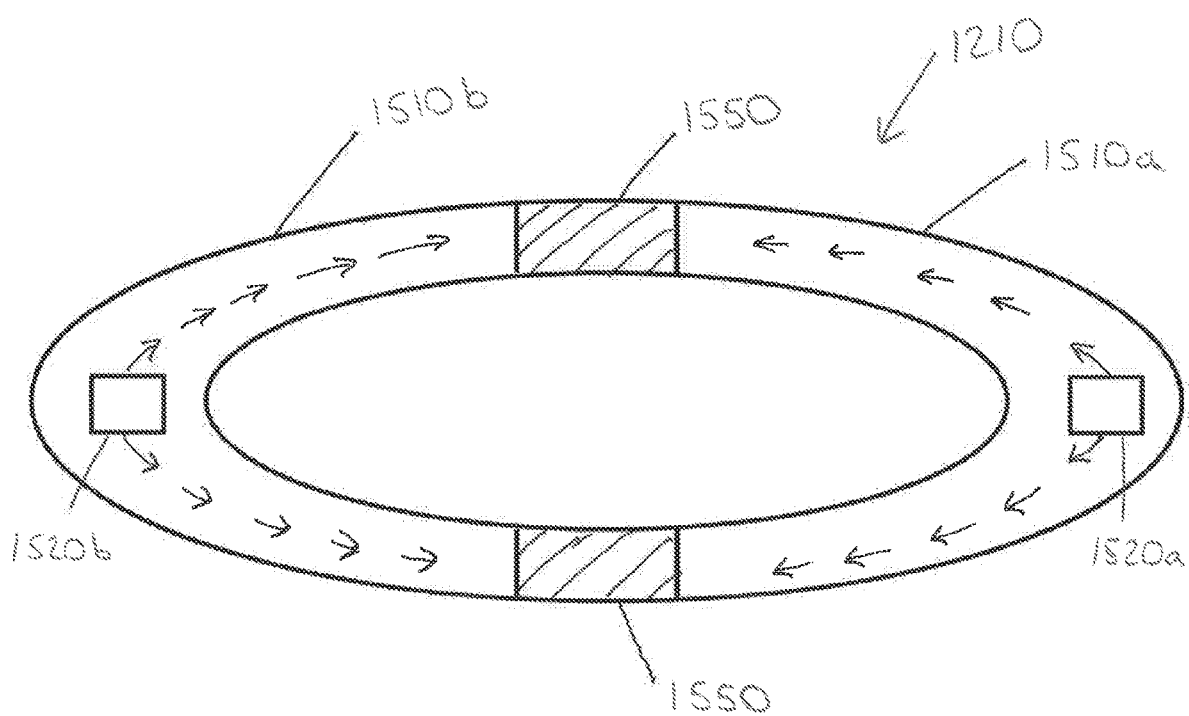
FIG. 15d schematically illustrates a head attachment unit 1210 comprising a first element and a second element.

FIG. 15d schematically illustrates a head attachment unit 1210 comprising a first element 1510a and a second element 1510b. In embodiments of the disclosure, the HMD 20 comprises a first attachment member 1510a and a second attachment member 1510b, wherein the adjustment unit 1220 is configured to adjust the weight distribution of the first element 1510a by adjusting a configuration of one or more mobile components 1520a of the first element 1510a and to adjust the weight distribution of the second element 1510b by adjusting a configuration of one or more mobile components 1520b of the second element 1510b without adjusting a position or an orientation of the first element 1510a and the second element 1510b with respect to the HMD. In some examples, the head attachment unit 1210 may comprise a first element 1510a included within a first attachment member and a second element 1510b included within a second attachment member, where the first attachment member and the second attachment member are connected by two respective adjustment mechanisms 1550 so that the first and second attachment members can be adjusted with respect to each other to suit a range of different head sizes. In some examples, the adjustment mechanisms 1550 may be made from flexible material to allow expansion and contraction of the adjuster to fit different head sizes. Alternatively, the adjustment mechanisms 1550 may comprise one or more electric motors each controlled by the processing unit 1230 to adjust a configuration of the head attachment unit 1210 by moving the respective attachment members towards each other or way from each other in dependence upon the size of the user's head. The first element 1510a and the second element 1510b both comprise one or more mobile components 1520a, 1520b which can be moved within the body of the respective elements so adjust the weight distribution of each element. In the example shown in FIG. 16, the first element 1510a may correspond to a rear portion of the HMD 20 which is proximate to the rear portion of the user's head and the second element 1510b may correspond to a front portion of the HMD 20 which is proximate to the user's forehead. This means that the weight distribution for the first element 1510a and the second element 1510b can be adjusted according to the user profile information to adjust weight distribution of the HMD 20 to improve user comfort whilst ensuring that the head attachment unit 1210 can be adjusted to fit a wide range of head sizes.

Figure 16:
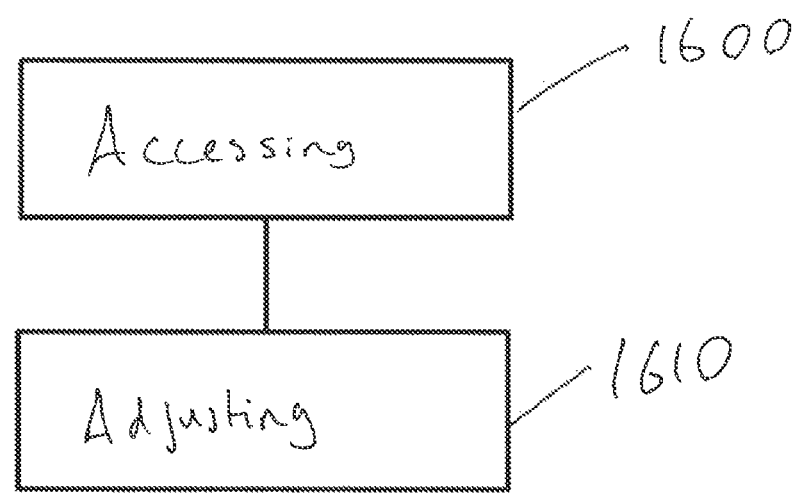
FIG. 16 is a schematic flowchart illustrating a method of adjusting a weight distribution of an HMD.

FIG. 16 is a schematic flowchart illustrating a method of adjusting a weight distribution of an HMD. In embodiments of the disclosure, a method of adjusting a weight distribution of an HMD apparatus comprising a head attachment unit comprising a first attachment member configured to attach the HMD to a user's head when the HMD is worn by the user and a first element having an adjustable weight distribution is provided. The method comprises:

accessing (at a step 1600) user profile information associated with the user; and adjusting (at a step 1610) a distribution of the weight of the HMD based on the user profile information, comprising adjusting the weight distribution of the first element of the HMD based on the user profile information by adjusting a configuration of one or more mobile components of the first element without adjusting a position or an orientation of the first element with respect to the HMD.

The method of adjusting a weight distribution of an HMD apparatus can be performed by an apparatus such as the HMD apparatus illustrated in FIGS. 12a and 12b. The user profile information can be stored by the HMD 20 or another device 300, 350 to which the HMD is connected, and the user profile information can be accessed by the HMD apparatus to perform the method of adjusting the weight distribution of the HMD apparatus.

It will be apparent to a person skilled in the art that variations in the above method corresponding to operation of the various embodiments of the apparatus as described and claimed herein are considered within the scope of the present invention. It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A head-mounted display (HMD) apparatus comprising:
a head attachment unit comprising a first attachment member configured to attach the HMD to a user's head when the HMD is worn by the user and a first element having an adjustable weight distribution; and
an adjustment unit configured to adjust a distribution of the weight of the HMD based on user profile information associated with the user, wherein the adjustment unit is configured to adjust the weight distribution of the first element of the HMD based on the user profile information by adjusting a configuration of one or more mobile components of the first element without adjusting a position or an orientation of the first element with respect to the HMD,
wherein the user profile information comprises information indicative of one or more characteristics of the user including at least one of:
an average head movement of the user indicative of a head movement propensity of the user; and
an average head orientation of the user indicative of a head posture tendency of the user, and
the adjustment unit is configured to adjust the distribution of the weight of the first element of the HMD based on one or more of the characteristics of the user.

2. An HMD apparatus according to claim 1, wherein the user profile information is stored in a non-transitory storage medium and the adjusting unit is configured to read the user profile information from the non-transitory storage medium prior to adjusting the weight distribution of the first element of the HMD.

3. An HMD apparatus according to claim 1, wherein the user profile information comprises weight distribution information indicative of a weight distribution of the HMD previously selected by the user.

4. An HMD apparatus according to claim 1, wherein the adjustment unit is configured to adjust at least one of a position and an orientation of the first element with respect to the HMD in accordance with the user profile information.

5. An HMD apparatus according to claim 1, wherein the first element extends from a front portion of the HMD proximate to the user's forehead to a rear portion of the HMD proximate to a rear portion of the user's head.

6. An HMD apparatus according to claim 1, wherein the first attachment member is configured to extend at least partially around a circumference of the user's head and the first attachment member comprises the first element.

7. An HMD apparatus according to claim 6, wherein the adjustment unit is configured to adjust a weight distribution of the first attachment member by adjusting the weight distribution of the first element.

8. An HMD apparatus according to claim 1, wherein the one or more mobile components comprise one or more mobile magnetically sensitive mass components.

9. An HMD apparatus according to claim 8, wherein the first element comprises a liquid and the one or more mobile components comprise one or more mobile magnetically sensitive mass components.

10. An HMD apparatus according to claim 8, wherein the adjustment unit is configured to adjust a position of each mobile magnetically sensitive mass component with respect to the first element in accordance with the user profile information.

11. An HMD apparatus according to claim 8, wherein the head attachment unit comprises a plurality of electromagnets each configured to generate a magnetic field that exerts a force on the mobile magnetically sensitive mass components within a predetermined distance of the electromagnet.

12. An HMD apparatus according to claim 11, wherein the plurality of electromagnets are positioned at respective locations with respect to the first element and each electromagnet is configured to generate an independently adjustable magnetic field to adjust a distribution of the plurality of magnetically sensitive mass components with respect to the first element.

13. An HMD apparatus according to claim 11, wherein the plurality of electromagnets are positioned at respective locations with respect to the first element and each electromagnet is configured to generate a magnetic field according to a predetermined schedule.

14. An HMD apparatus according to claim 1 comprising a second attachment member, wherein the adjustment unit is configured to adjust the weight distribution of the second element by adjusting a configuration of one or more mobile components of the second element without adjusting a position or an orientation of the first element with respect to the HMD.

15. An HMD apparatus according to claim 14, wherein the adjustment unit is configured to adjust the weight distribution of the first element and the weight distribution of the second element to adjust the distribution of the weight of the HMD in accordance with the user profile information.

16. A method of adjusting a weight distribution of a head-mounted display (HMD) apparatus comprising a head attachment unit comprising a first attachment member configured to attach the HMD to a user's head when the HMD is worn by the user and a first element having an adjustable weight distribution, the method comprising:
accessing user profile information associated with the user; and
adjusting a distribution of the weight of the HMD based on the user profile information, comprising adjusting the weight distribution of the first element of the HMD based on the user profile information by adjusting a configuration of one or more mobile components of the first element without adjusting a position or an orientation of the first element with respect to the HMD,
wherein the user profile information comprises information indicative of one or more characteristics of the user including at least one of:
an average head movement of the user indicative of a head movement propensity of the user; and
an average head orientation of the user indicative of a head posture tendency of the user, and
the adjusting includes adjusting the distribution of the weight of the first element of the HMD based on one or more of the characteristics of the user.

17. A non-transitory machine-readable storage medium which stores computer software which, when executed by a computer, causes the computer to carry out a method of adjusting a weight distribution of a head-mounted display (HMD) apparatus comprising a head attachment unit comprising a first attachment member configured to attach the HMD to a user's head when the HMD is worn by the user and a first element having an adjustable weight distribution, the method comprising:
accessing user profile information associated with the user; and
adjusting a distribution of the weight of the HMD based on the user profile information, comprising adjusting the weight distribution of the first element of the HMD based on the user profile information by adjusting a configuration of one or more mobile components of the first element without adjusting a position or an orientation of the first element with respect to the HMD, wherein the user profile information comprises information indicative of one or more characteristics of the user including at least one of:

an average head movement of the user indicative of a head movement propensity of the user; and an average head orientation of the user indicative of a head posture tendency of the user, and the adjusting includes adjusting the distribution of the weight of the first element of the HMD based on one or more of the characteristics of the user.

18. An HMD apparatus according to claim 6, wherein the first element is configured to extend at least partially around the circumference of the user's head such that, at least one of:

the one or more mobile components of the first element are movable at least partially around the circumference of the user's head; and the one or more mobile components of the first element are movable from one side of the user's head to another side of the users head.

19. An HMD apparatus according to claim 1, wherein the adjustment unit is configured to adjust the distribution of the weight of the first element of the HMD prior to an initial movement of the user's head.

\* \* \* \* \*